United States Patent
Majumdar et al.

(10) Patent No.: US 10,919,242 B2
(45) Date of Patent: Feb. 16, 2021

(54) PNEUMATIC TIRE WITH IN-SITU GENERATED SEALANT COMPOSITION BY CHAIN CESSATION OF IONIC BUTYL

(71) Applicant: Triangle Tyre Co. Ltd., Weihai (CN)

(72) Inventors: Ramendra Majumdar, Hudson, OH (US); Lingbo Dong, Weihai (CN); Dapeng Wang, Weihai (CN)

(73) Assignee: Triangle Tyre Co. Ltd., Weihai (CN)

( * ) Notice: Subject to any disclaimer, the term of this patent is extended or adjusted under 35 U.S.C. 154(b) by 0 days.

(21) Appl. No.: 16/819,701

(22) Filed: Mar. 16, 2020

(65) Prior Publication Data

US 2020/0215775 A1 Jul. 9, 2020

Related U.S. Application Data

(63) Continuation-in-part of application No. 14/991,575, filed on Jan. 8, 2016, now Pat. No. 10,589,478, which is a continuation-in-part of application No. 14/572,138, filed on Dec. 16, 2014, now Pat. No. 10,399,391.

(51) Int. Cl.
 *B60C 19/12* (2006.01)
 *B29C 73/16* (2006.01)

(52) U.S. Cl.
 CPC ............ *B29C 73/163* (2013.01); *B60C 19/12* (2013.01)

(58) Field of Classification Search
 None
 See application file for complete search history.

(56) References Cited

U.S. PATENT DOCUMENTS

| | | |
|---|---|---|
| 4,895,610 A | 1/1990 | Egan |
| 6,837,287 B2 | 1/2005 | Smith, Sr. et al. |
| 6,915,826 B2 | 7/2005 | Poling et al. |
| 6,962,181 B2 | 11/2005 | Deevers et al. |
| 7,073,550 B2 | 7/2006 | Reiter et al. |
| 7,332,047 B2 | 2/2008 | Majumdar et al. |
| 7,419,557 B2 | 9/2008 | Majumdar et al. |
| 7,662,480 B2 | 2/2010 | Resendes et al. |
| 7,674,344 B2 | 3/2010 | D'Sidocky et al. |
| 8,021,730 B2 | 9/2011 | Tsou et al. |
| 8,158,721 B2 | 4/2012 | Stevenson et al. |
| 8,293,049 B2 | 10/2012 | Incavo |

(Continued)

OTHER PUBLICATIONS

D. Adkinson, S. Malmberg, J. Bielby, and K. Kulbaba, "Butyl Ionomers—A New Grade of Butyl Rubber for Tire Applications", Rubber Division, American Chemical Society, Fall 186th technical Meeting, Paper # 45, Oct. 14-16, 2014.

(Continued)

*Primary Examiner* — Kendra Ly
(74) *Attorney, Agent, or Firm* — Brian P. Harrod; George W. Moxon, II

(57) ABSTRACT

The present invention is directed to a tire with in-situ generated built-in puncture sealant comprising a supporting tire carcass comprised of one or more layers of ply, an outer circumferential tread, and a radially inner layer, a pair of beads, sidewalls extending radially inward from the axial outer edges of the tread portion to join the respective beads, a sealant comprising the chain cessation product of a butyl ionomer-based rubber sealant precursor composition catalyzed by peroxide disposed inwardly from said radially inner layer, and wherein said sealant provides self-sealing properties to the tire.

16 Claims, 2 Drawing Sheets

(56) References Cited

U.S. PATENT DOCUMENTS

| | | |
|---|---|---|
| 8,534,331 B2 | 9/2013 | Dubos et al. |
| 8,646,501 B2 | 2/2014 | Ruegg, Jr. |
| 8,776,851 B2 | 7/2014 | Majumdar |
| 8,946,319 B2 | 2/2015 | Adkinson et al. |
| 2005/0113502 A1 | 5/2005 | Fitzharris Wall et al. |
| 2005/0215684 A1 | 9/2005 | Fitzharris Wall |
| 2005/0222335 A1 | 10/2005 | Jones et al. |
| 2007/0044883 A1 | 3/2007 | D'Sidocky et al. |
| 2009/0205765 A1 | 8/2009 | Sostmann et al. |
| 2012/0148773 A1 | 6/2012 | Parent et al. |
| 2016/0068031 A1 | 3/2016 | Kaszas et al. |

OTHER PUBLICATIONS

D. Adkinson, S. Malmberg, J. Bielby, and K. Kulbaba, "Butyl Ionomers—A New Class of Butyl Rubber for Tire Inner Liner Applications", ITEC 2014, Paper # 41, Sep. 9, 2014.

G. Bohm, L Jia, and G. Stephanopoulos, "Core Rubber Recycling Problems and New Solutions", Tire Technology Expo, Hannover, Germany, Feb. 27, 2020.

PNEUMATIC TIRE WITH IN-SITU GENERATED SEALANT COMPOSITION BY CHAIN CESSATION OF IONIC BUTYL

CROSS REFERENCE TO RELATED APPLICATIONS

This application is a continuation-in-part of, and claims the benefit of, U.S. patent application Ser. No. 14/991,575, filed Jan. 8, 2016, which is entitled "Pneumatic Tire Having Sealant Layer," which is a continuation-in-part of, and claims the benefit of, U.S. patent application Ser. No. 14/572,138, filed Dec. 16, 2014, which is entitled "Pneumatic Tire Having Multiple Built-In Sealant Layers and Preparation Therefore," and is incorporated herein by reference.

BACKGROUND OF THE INVENTION

The present invention is directed to tires having inner sealant layers, and in particular to tires having a butyl ionomer containing sealant layer formed from sealant precursor layer.

Tires consist of multiple annular layers of different compounds, plies, belts, etc., and they are applied before cure in tire building drum for accurate alignment and for higher interlayer bond strengths. Joining and aligning layers before cure result in tire with better uniformity and durability.

Tire puncture is an inherent issue for rubber pneumatic tires. Because of that, sealants have been developed and placed as a layer inner to the tire tread and plies to minimize the impact of the puncture. The absence of suitable technology forces tire companies to apply annular sealant layers after the tires are cured. Examination of recent passenger car (PCR) sealant tires from major tires manufacturers showed no curing bladder markings at the innermost layer thus indicating that annular sealant layers are applied after the tires are cured. Application of sealant to a cured tire is not manufacturing-friendly since the innerliner needs to be very clean prior to sealant application for better bonding of sealant-to-innerliner. The way most tires are manufactured, the innermost layer is mostly contaminated with silicones from inside tire paint and/or from curing bladder lubricant. Moreover, application of perfectly aligned sealant inside cured tire is cumbersome and time consuming.

Sealants in cured tires need to have low viscosity (or low storage modulus, G') so that they can easily flow and plug nail holes. Such low viscosity material cannot be directly applied in tire building drum as they will fall off or deform if applied in tire building drum. Further, punctures can occur at any temperature. A single layer of sealant of low viscosity may work very well at low temperature, but at high temperatures, it might achieve a very low viscosity, which would allow it to flow and pass out of tire during use. By depleting the tire sealant, the tire loses its puncture sealing capacity. Likewise, a single layer of sealant of high viscosity may be very good for high temperature but might be almost solid at cold temperature and thus unable to flow to plug puncture in tires at cold temperature.

Tires with built-in sealant layer are known in the art. Typically, these tire sealants are formed during tire cure by thermal degradation of peroxide-containing butyl-rubber-based sealant precursor layers, such as for example, U.S. Pat. Nos. 4,895,610; 6,962,181; 7,073,550; 7,674,344; and 8,293.049; and US Patent Publication Nos. 2005/0113502 and 2005/021568, the teachings of which are all hereby incorporated by reference. Sealant layers may be of black or non-black colors and may incorporate short fibers, such as polyester or polyurethane fibers, and other filler aggregate into sealant layers to help to plug nail hole punctures.

BRIEF SUMMARY OF THE INVENTION

The present invention is directed to a tire with in-situ generated built-in puncture sealant comprising a supporting tire carcass comprised of one or more layers of ply, an outer circumferential tread, and a radially inner layer, a pair of beads, sidewalls extending radially inward from the axial outer edges of the tread portion to join the respective beads, a sealant comprising the chain cessation product of a butyl ionomer-based rubber sealant precursor composition catalyzed by peroxide disposed inwardly from said radially inner layer, and wherein said sealant provides self-sealing properties to the tire.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
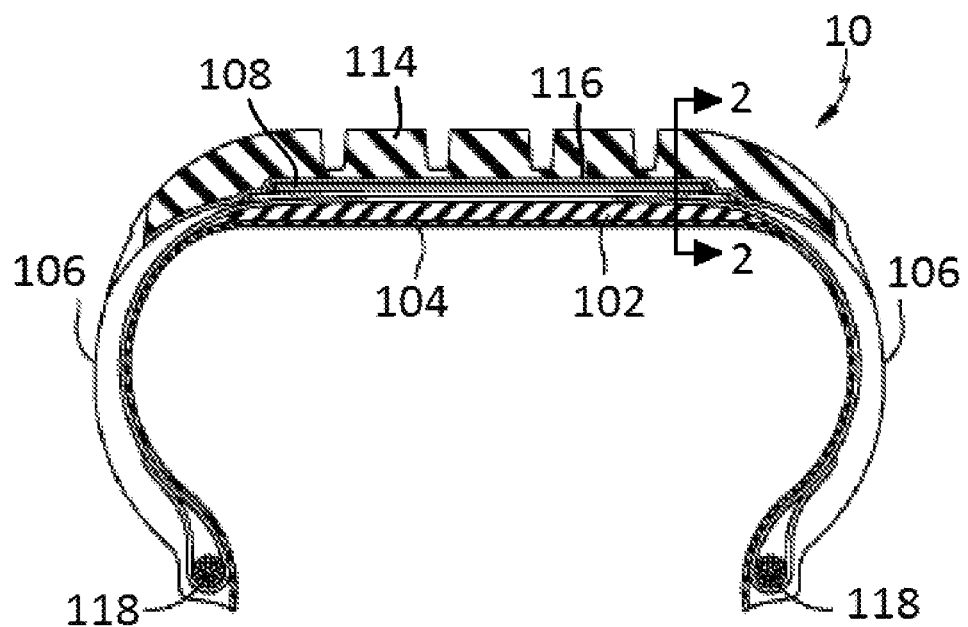
FIG. 1 is a cross-sectional view of a tire using the present invention.

The present invention is directed to a tire having a sealant layer formed from a precursor during tire cure by chain cessation of butyl ionomer containing composition catalyzed by peroxide. Thus, the tire has a very low molecular weight butyl ionomer sealant layer disposed inside the tire formed from a very high molecular weight butyl ionomer sealant precursor layer.

When chain cessation of high molecular weight ionic butyl polymer occurs, low molecular weight ionic butyl polymer is formed. Such low molecular weight ionic butyl polymer can also be called liquid ionic butyl polymer or ionic butyl oligomer. As used herein, "oligomer" refers to a material having molecular weight significantly lower than the original polymer/rubber. Oligomers are tacky to touch and often are high viscous liquid.

Most rubbers, like natural rubber (NR), nitrile rubber (NBR), styrene-butadiene rubber (SBR), bromobutyl rubber (BIIR), chlorobutyl rubber (CDR), butadiene rubber (BR), etc., crosslink when heated with suitable peroxide and storage modulus (G') increases after cure. One known exception is butyl rubber (IIR) where chain cessation occurs resulting in decrease in viscosity or G' after heating to tire cure temperature.

Ionic butyl is prepared by introducing ionic group in BIIR:

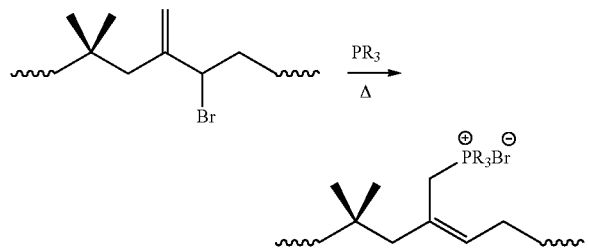

Unlike BIIR, ionic butyl undergoes chain cessation when heated with suitable peroxide. This new property generated by converting BIIR into ionic butyl can be used to make a sealant precursor which can be applied in the tire building drum that undergo chain cessation during tire cure forming sealant layer. This allows for a suitable manufacturing friendly PCR tire where sealant precursor layer is applied in tire building drum which is converted into a sealant layer during tire cure.

The tire comprises a supporting tire carcass comprised of one or more layers of ply, an outer circumferential tread, and a radially innermost innerliner layer, a pair of beads, sidewalls extending radially inward from the axial outer edges of the tread portion to join the respective beads, a sealant layer, and a cover layer, disposed on said tire carcass innermost layer, wherein the sealant is formed during tire cure by chain cessation of butyl ionomer based compound in the presence of peroxide to form an inner layer of low molecular weight butyl ionomer sealant, disposed inwardly from said tire carcass inner layer, to provides self-sealing properties to the tire.

As used herein, the term "sealant precursor" means the compound by itself is not a sealant, but it is transformed into sealant by chain cessation during the curing step of tire making. The "precursor layer" is the layer of sealant precursor. The precursor layer can be 100% butyl ionomer rubber or can be butyl ionomer rubber blended with other rubbers that can be transformed into a sealant, such as a mixture or both butyl ionomer and butyl rubber, which also undergo chain cessation during tire curing at high temperature to form low molecular weight easy to flow tacky sealants.

In the present invention, a sealant precursor layer is assembled into an unvulcanized rubber tire (generally called a Green Tire) using conventional tire building techniques. After an unvulcanized tire is built, including such a sealant precursor layer, the tire is vulcanized employing standard methods. Such a sealant precursor layer is assembled into the tire inwardly from the tire's supporting carcass and outwardly from an innerliner layer (which can be an air barrier layer) in the unvulcanized tire. Alternatively, the sealant precursor layer can also be placed inner to tire innerliner, and, in this case a sealant cover layer is needed, inner to sealant precursor layer with width greater than the sealant precursor layer. The purpose of the sealant cover layer is to prevent thinning of the sealant layer by pressure of the tire curing bladder and to prevent contamination of the tire curing bladder by tacky sealant.

The physical nature of the sealant precursor layer is that its viscosity is high enough to permit easy handling during the standard steps in the construction of an unvulcanized tire, that is, the sealant precursor layer has enough uncured strength (modulus) to retain its shape during building, and enough tack to stick to adjacent layers during green tire building. After high temperature and pressure vulcanization, sealant layer with low G' is sandwiched between cured layers of significantly higher G'. A typical change of G' at 80° C. of sealant precursor layer (chain cessation) and sealant cover layer (crosslinking reaction) by applicants own experimentations is shown below:

|  | Sealant Precursor * | Sealant Cover Layer |
| --- | --- | --- |
| G' at 80° C./5%/1 Hz (MPa) | 0.16 | 0.12 |
| Vulcanization | Chain cessation to form sealant | Crosslinking reaction |
| G' at 80° C./5%/1 Hz (MPa) | 0.002-0.1 | 2.5 |

* Varied amount and type of peroxide

As the tire is vulcanized with sealant precursor layer, sealant layer is formed in situ, by chain cessation of butyl ionomer. In effect, the butyl ionomer rubber in the sealant precursor layer formed a low viscosity (or low G'), easy to flow tacky material by chain cessation reaction, which has puncture sealing properties. Thus, the sealant precursor layer is transformed into a puncture sealant layer during the high temperature curing of the tire. The chain cessation of the sealant precursor layer is effectuated by the presence of one or more peroxides which acts as a catalyst.

Most rubber compositions, e.g. those based on natural rubber, butadiene rubber, styrene butadiene rubber etc. when heated in the presence of peroxides, harden due to cross linking reactions. However, butyl rubber-based compositions, when heated with peroxide, the material softens predominantly due to chain cessation. Bromination of butyl rubber produces bromobutyl rubber. Unlike butyl rubber, bromobutyl rubber crosslinks in the presence of peroxide thus giving rise to hardened rubber. Ionic butyl is produced by chemical reaction of bromobutyl as shown below:

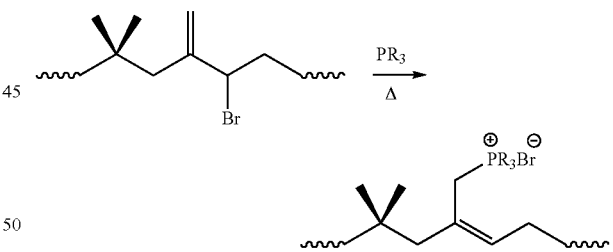

During experimentation, it was found that, unlike bromobutyl, which hardens by crosslinking when heated with peroxide, ionic butyl undergo chain cessation when heated with peroxide forming tacky and softer material. Thus, compositions containing ionic butyl and suitable peroxides were formulated as sealant precursors that degrade during high temperature tire cure and form easy to flow tire sealant material.

Figure 4:
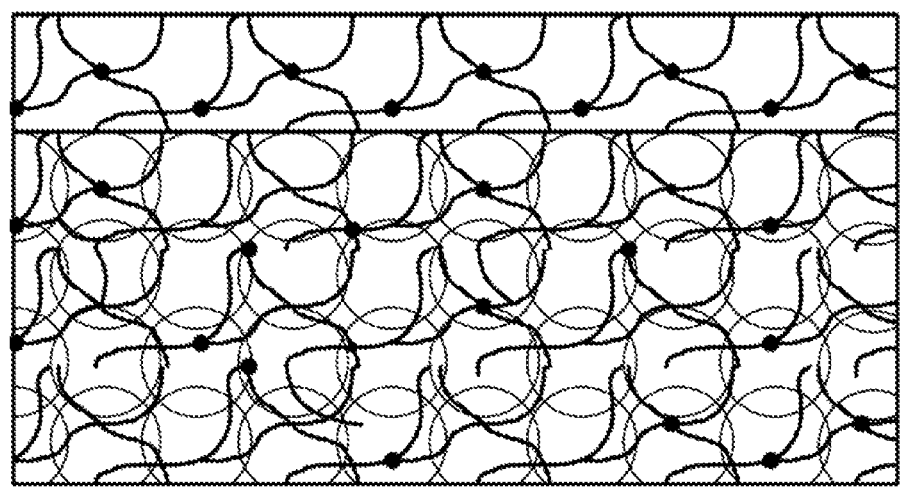
FIG. 4 is depiction of a microscopic level of a prior art tire showing high molecular weight ionic butyl polymer in solvent (circles) with no interfacial bond formation.

The prior art (e.g. Kaszas et al. US 2016/0068031, see FIG. 4) teach sealant composition where high molecular weight ionic butyl is dissolved in a large amount of solvent (polybutene) followed by crosslinking using magnesium oxide as the crosslinking agent. The purpose of the crosslinking reaction in this prior art is to increase the viscosity of the original mixture as the original mixture has very low viscosity and pass out of nail hole rather than repairing the nail hole. Thus, the sealants of the prior art such as Kaszas et al. are based on crosslinking reaction of ionic butyl dissolved a liquid solvent. Crosslinking sites in FIG. 4 are shown in small solid circles.

Kaszas et al. never demonstrated sealant formation using peroxide but it appears the inventors assumed a crosslinking reaction would take place with peroxide, but apparently never actually tested it. Had Kaszas et al. tried peroxide, they would have found that degradation by chain cessation would have occurred resulting in the formation of a very low viscosity fluid with less viscosity than original solvent polymer mixture. This low viscosity fluid could not have been used as tire sealant and would have rapidly passed out of tire puncture.

Most rubber, including halobutyl rubber, crosslinks with peroxide. Since ionic butyl is derived from halobutyl, Kaszas et al. apparently thought that ionic butyl would also crosslink with peroxide. However, through experimentation, the inventors of the instant application discovered that ionic butyl degrades by chain cessation and hence can be utilized for built-in sealant tire. If one were to put solvent in the degraded ionic butyl of the present invention, it would be too thin (very low viscosity) to be used as a sealant and would flow out of any tire puncture holes.

Butyl ionomers are derived from halobutyl rubber. Halobutyl rubbers are derived from butyl rubber. Butyl rubber is produced by copolymerizing isobutylene with small amounts of isoprene. Generally, butyl rubber contains from about 0.5 to 4 mole % isoprene and from about 96 to 99.5 mole % percent isobutylene unit. The butyl rubber that can be employed in the polymer composition of the tires of this invention has a number average molecular weight in the range of 200,000 to 600,000 and preferably in the range of about 300,000 to about 500,000. Butyl rubber is then converted to bromobutyl rubber, which is then transformed to butyl ionomers by converting the bromine functionalities into ionic imidazolium bromide groups which results in the formation of reversible ionic associations that exhibit physical cross-linking ability.

At least one butyl ionomer is available from Arlanxeo with trade name X_Butyl™ I4565P that has ML(1+8) value of 56±4 MU at 125° C. and ion content of 0.4±1 mole %, total reactive bromine content of 0.5±0.2 mole % and 1,4-isoprene content of 0.5±0.2 mole %.

Compositions based on 100 phr butyl ionomer rubber can be used in making sealant precursor. Butyl ionomer can be used in combination with other elastomers that degrade at tire cure temperature. One example of such polymer is butyl rubber. Thus, 100 to 5 phr ionic butyl in combination with 0 to 95 phr butyl rubber can be used to create tire puncture sealant composition.

It is preferable for the polymer composition layer assembled into the tires of this invention to have the following composition in parts per hundred rubber (phr):

100 phr butyl ionomer rubber e.g. X_butyl™ I4565P from Arlanxeo about 10 to 100 phr of silicon dioxide e.g. Sidistar 320 or other filler about 1 to 15 phr of tackifier e.g. Wingtack 85 from Total about 20 to 200 phr calcium carbonate e.g. Hubercarb Q3 from Huber about 5 to 35 phr oil, and from about 4 to 16 phr suitable peroxide.

Any peroxide or combination of peroxides that catalyze the degradation (chain cessation) of ionic butyl based precursor compound at tire cure temperature (130°-210° C.) can be employed. Preferably peroxide compounds are employed which only disintegrate at high temperatures, that is, above about 100° C. (212° F.). Examples of such peroxides are tert.butyl perbenzoate and dialkyl peroxides with the same or different radicals, such as dialkylbenzene peroxides and alkyl peresters. Preferably the peroxide vulcanizing agent employed will contain two peroxide groups. Frequently the peroxide groups are attached to a tertiary butyl ionomer group. The basic moiety on which the two peroxide groups are suspended can be aliphatic, cycloaliphatic, or aromatic radicals. Some representative examples of such peroxide vulcanizing agents include: 2,5-bis(t-butyl peroxy)-2,5-dimethyl hexane; 1,1-di-t-butyl peroxi-3,3,5-trimethyl cyclohexane; 2,5-dimethyl-2,5-di(t-butyl peroxy) hexyne-3; p-chlorobenzyl peroxide; 2,4-dichlorobenzyl peroxide; 2,2-bis-(t-butyl peroxi)-butane; di-t-butyl peroxide; benzyl peroxide; 2,5-bis(t-butyl peroxy)-2,5-dimethyl hexane, dicumyl peroxide; and 2,5-dimethyl-2,5-di(t-butyl peroxy) hexane. Such peroxide catalyst for chain cessation can be added to the polymer composition layer in pure form (100 percent active peroxide) or on an inert, free-flowing mineral carrier. Calcium carbonate and silica are some examples of inert carrier. Such carrier composition containing from about 35 to 60 weight percent active ingredient (peroxide) can be employed very successfully. For example, 40 percent by weight dicumylperoxide on an inert carrier can be employed as the peroxide vulcanizing agent in the polymer composition layer with good results.

While the mechanism may not be fully understood, it is within the scope of the present invention to employ an activating agent, such as 2,2,6,6-tetra alkyl piperidine based hindered amine, which will activate the organoperoxide, and in a sense, enable a reduction in the amount of the organoperoxide to more efficiently degrade the butyl ionomer rubber during the formation of the sealant layer. Such activating agents are known in the art, such as U.S. Pat. No. 7,674,344 to D'Sidocky et al., the disclosure of which is incorporated by reference.

One representative example of such 2,2,6,6-tetra alkyl piperidine based hindered amine is, for example, a 50/50 mixture of poly[[6-[1,1,3,3,-tetramethylbutyl)amino]-s-triazine-2,4-diyl][2,2,6,6,-tetramethyl-4-piperidyl)imino] hexamethylene[(2,2,6,6-tetramethyl-4-piperidyl)imino]] compound (referred to herein as "PTP") and bis(hydrogenated tallow alkyl), amines oxidized and sold as Irgastab® FS410 FF from BASF.

Another example of peroxide activating agent is a mixture of PTP, bis(hydrogenated tallow alkyl) amines oxidized, and bis(2,2,6,6-tetramethyl-4-piperidinyl) sebacate sold as Irgastab® FS811 from BASF.

Another example of peroxide activating agent is poly[[6-[1,1,3,3,-tetramethylbutyl)amino]-1,3,5-triazine-2,4-diyl][2,2,6,6,-tetramethyl-4-piperidyl)imino]-1,6-hexanediyl[(2,2,6,6-tetramethyl-4-piperidinyl)imino]] available as Chimassorb® 944 FDL from BASF.

In practice, exemplary of composites that contain, and therefore are comprised of, said PTP, are composites comprised of said PTP which may also comprise said bis(2,2,6,6-tetramethyl-4-piperidinyl)sebacate and which may also optionally contain an oxidized bis(halogenated tallow alkyl amine). In practice, the aspect of utilizing said 2,2,6,6-tetra alkyl piperidine based hindered amines, and particularly said PTP or composites of 2,2,6,6-tetra alkyl piperidine based hindered amines which contain (include) said PTP to activate the organoperoxide in the chain cessation of the butyl ionomer rubber of the sealant precursor is considered herein to be important in order to reduce as much as possible the concentration of the organoperoxide in the sealant precursor butyl ionomer rubber-based composition, as well as excess unreacted organoperoxide which may remain in the resultant built-in sealant layer which may, in turn, gradually become available to contact rubber components of the tire adjacent to the built-in sealant layer.

The various components of the sealant layer can be mixed together using any convenient rubber mixing equipment, such as a Banbury mixer. This rubber composition used in the sealant layer has sufficient viscosity and unvulcanized adhesion to enable its incorporation into an unvulcanized tire without departing from standard, long standing tire building techniques and without the use of complicated, expensive tire building equipment.

The strip of butyl ionomer based sealant precursor composition should extend from one shoulder of the tire to the other, in other words, it should cover the crown area of the tire. The thickness of the sealant precursor layer can vary depending on tire size. Generally, the thickness of the polymer composition layer will range from about 0.1 cm (0.04 inches) to about 0.635 cm (0.25 inches). It is generally preferred for the polymer composition layer to have a thickness of 0.2 cm (0.08 inches) to 0.4 cm (0.16 inches). In passenger tires it is normally most preferred for the polymer composition layer to have a thickness of about 0.25 cm (0.1 inches).

After the unvulcanized pneumatic rubber tires of this invention are assembled, they are vulcanized using a normal tire cure cycle. The tires of this invention can be cured over a wide temperature range. However, it is generally preferred for the tires of this invention to be cured at a temperature ranging from about 132° C. (270° F.) to about 166° C. (330° F.). It is more preferred for the tires of this invention to be cured at a temperature ranging from a 143° C. (290° F.) to 154° C. (310° F.). It is generally preferable for the cure cycle used to vulcanize the tires of this invention to have a duration of about 10 to 14 minutes with a cure cycle of about 12 minutes being most preferred.

The present invention employs a standard tire-building process. After the green (uncured) tire is built, an optional protective film can be applied on the top of the innermost sealant cover layer. The width of the film is slightly wider than the sealant layer (approximately 2 inches more on both sides). This film protects the tire curing bladder and keeps it clean in case the innermost sealant cover layer ruptures or tears in the mold. Such films are known in the art. One such film is 2 mil undrawn nylon 6, 6 available as DARTEK® C917 from TC Transcontinental. About 1" (inch) of the film is overlapped at the end so that, after tire cure, it functions as a pull tab to facilitate easy removal. Such a system is described in U.S. Pat. No. 7,332,047 to Majumdar, Logan, and Lukich, and is hereby incorporated herein by reference. The protective film can also be applied as first layer in tire building drum. For convenience, the two edges of the film are preferentially coated with a pressure-sensitive adhesive (PSA)-coated thermoformable film. Such a system is described in U.S. Pat. No. 7,419,557 to Majumdar and Page, and is hereby incorporated herein by reference. Although the film is not critical, Dynamically Vulcanized Alloy (DVA) film is preferred in tire building drum over nylon-6,6 film because DVA has significantly lower low strain modulus and hence can expand using less force during the green tire building process. Such a material is described in U.S. Pat. No. 8,776,851 to Majumdar, and is hereby incorporated herein by reference. Other examples are U.S. Pat. Nos. 8,021,730 and 8,158,721, hereby incorporated herein by reference. An activating agent for organoperoxide can be added in the sealant composition for faster chain cessation. Such a method is described in U.S. Pat. No. 7,674,344 to D'Sidocky et al., and is hereby incorporated herein by reference.

The present invention incorporates an inner liner and a sealant precursor layer. The inner liner comprises bromobutyl rubber, carbon black, naphthenic oil, stearic acid, phenolic resin tackifier, mixture of aromatic hydrocarbon resins (as found in STRUKTOL® 40 MS resin, manufactured by Struktol Company of America), MgO, ZnO, Sulfur, 2,2'-dithiobis(benzothiazole) (commonly sold as MTBS). The sealant precursors comprise butyl ionomer rubber, paraffinic oil, silica, clay, titanium dioxide, talc, color concentrate (such as AKROSPERSE® E2295 Green manufactured by Akrochem Corporation, AKROSPERSE® E6615 Orange manufactured by Akrochem Corporation), blend of fatty acid derivatives processing additives (such as STRUKTOL® HPS 11 processing additive manufactured by Struktol Company of America), in the first non-productive (NP) mixing pass. Organic peroxide, such as n-butyl 4,4-bis(t-butyl-peroxy)valerate (such as TRIGONOX® 17-40B-GR manufactured by Nouryon) can be added in the final productive (PR) pass.

Preferably the tire of the present invention is prepared in the following sequences:
1. A sealant cover layer having formulation shown in Table 1 is mixed and calendered to a thickness of 1 mm, and a width equal to the inner liner width.
2. A precursor for the sealant having formulation shown in Table 2 is mixed and calendered to a thickness of 3 mm thick, and a width equal to the tread width less about 15 mm (i.e., tread width minus 15 mm).
3. The sealant cover layer (#1 above) is applied to the tire-building drum.
4. Next, the precursor for the sealant (#2 above) is applied to the tire-building drum.
5. Next, the inner liner is applied in a tire-building drum as in typical tire building process followed by the rest of the layers employed in a normal tire build.

EXAMPLES

Experiment 1

Formula for precursor is shown in Table 1. Sealant is first formed by heating the precursor (0.04" thick) between cured innerliner and nylon film (12 min/200° C./200 psi). Then nylon film was replaced with a cured innerliner and then pressed with a roller for uniform distribution of sealant. After cooling down, peel strength was determined at room temperature and at 100° C. Results are shown in Table 2. The separation is at the interface of the sealant and the innerliner; this kind of failure is referred to as an "adhesive failure".

TABLE 1

| Sealant precursor composition | |
|---|---|
| Ingredient | phr |
| Butyl Ionomer | 100 |
| Struktol HPS 11 | 4 |
| Akrosperse 409 Green MB | 2 |
| Sunpar 2280 | 25 |
| Silene 732D | 50 |
| Koresin Pellets | 5 |
| Calcium Carbonate | 100 |
| Akrochem DiCup 40K | 9 |

TABLE 2

|  | Experiment 1 Cured Innerliner Joined with Sealant (Prior Art) | Experiment 2 Cured innerliner joined with sealant and then heated to cure temperature (Prior Art) | Experiment 3 Green innerliner joined with sealant precursor and then heated to generate sealant (Present Invention) |
|---|---|---|---|
| Average Adhesion at 23° C. (lb./in) | 2.37 | 1.80 | 3.43+ |
| Average Adhesion at 100° C. (lb./in) | 0.17 | 0.16 | 0.58+ |
| Failure type | Adhesive | Adhesive | Cohesive |
| Failure picture |  |  |  |

Experiment-2

Initially the same as experiment 1, except that after the nylon film was replaced with a cured innerliner, the laminate was again pressed at high temperature and pressure (12 min/200° C./200 psi). After cooling down, peel strength was determined at room temperature and at 100° C. Results are shown in Table 2. The separation is at the interface of the sealant and the innerliner; this is an adhesive failure.

Experiment 3

Precursor of Table 1 (0.04" thick) was placed between two uncured innerliner. Then the laminate was heated to tire curing conditions (12 min/200° C./200 psi). After cooling down, peel strength was determined at room temperature and at 100° C. Results are shown in Table 2. No separation occurred at the interface of the innerliner and the sealant and hence "+" is added at the end of the adhesion value. In fact, the sealant tore from the middle and ½ on one side and the other ½ on the other side and this kind of failure is referred to as a "cohesive failure".

These experiments show that when two uncured pieces were joined by sealant precursor and then cured, bond strength is higher compared to two cured pieces joined by already formed sealant (23° C. adhesion: 3.43+lb./inch vs 237 or 1.80 lb./inch). This is because of some interfacial chemical reactions occur forming some chemical bonds between the sealant layer and the surrounding layers (present invention). When sealant is applied to already cured innerliner, no chemical interfacial bond is formed giving low bond strength and hence relatively inferior tire (e.g. US 2016/0068031, see FIG. 4). This is consistent with work of others, e.g., Bohm et al. in their presentation "Core Rubber Recycling Problems and New Solutions" presented at the Tire Technology Expo in Hannover, Germany on Feb. 27, 2020 found good adhesion when two uncured layers were joined and then cured (212 lb./inch) and poor adhesion when one uncured rubber and one cured rubber are joined and then cured (10 lb./inch or less). High adhesion of sealant to innerliner is needed otherwise the sealant may fall off generating scrap tire or the sealant may move generating tire balance issues.

A butyl ionomer rubber-based sealant precursor composition is prepared by mixing the ingredients in an internal mixer for detailed evaluation. The ingredients are mixed in a first, non-productive, mixing stage without the organoperoxide, followed by a second, productive, mixing stage in which the organoperoxide is added. The ingredients are illustrated in the following Table 3. The ingredients are in parts per hundred rubber.

TABLE 3

| Sealant precursor | |
|---|---|
|  | Example 1 (phr) |
| Non-Productive (NP) |  |
| Butyl Ionomer Rubber | 100.00 |
| Paraffinic oil | 25.00 |
| Silica | 50.00 |
| Calcium Carbonate | 100.00 |
| Tackifier | 5.00 |
| AKROSPERSE ® 626 Blue | 2.00 |
| STRUKTOL ® HPS 11 Processing Additive | 4.00 |
| TOTAL (NP) | 286.00 |
| n-butyl 4,4-bis(t-butyl-peroxy)valerate | 12.00 |
| ODR 150° C./R25/30'/3°Arc |  |
| Initial Torque (lbf · in) | 15 |
| Minimum Torque, ML (lbf · in) | 4.49 |
| Torque at 30' (lbf · in) | 4.49 |
| Green Strength |  |
| Tensile (psi) | 124 |
| % Elongation | 1255 |
| M100 (psi) | 46 |
| M200 (psi) | 52 |
| M300 (psi) | 55 |

The resulting composition could be processed and used as a sealant precursor in a tire building process. Table 3 also shows Oscillation Disc Rheometer (ODR) data of example 1. Initial torque is 15 lbf·in and after 30 minutes at 150° C. (simulates tire cure), chain cessation of precursor to sealant is formed resulting in lowering of final torque to 4.49 lbf·in. Tensile properties of uncured sheet of sealant precursor layer called green strength are also shown in Table 3. In Table 3, M100, M200, M300 are respectively modulus at 100%, 200% and 300% strains.

Additional butyl ionomer rubber-based sealant precursor compositions were prepared by mixing the ingredients in an internal mixer. The ingredients are mixed in a first, non-productive, mixing stage without the organoperoxide followed by a second, productive, mixing stage in which the organoperoxide is added. The ingredients are illustrated in the following Table 4. The ingredients are in parts per hundred rubber.

TABLE 4

| Additional Examples | | | | |
|---|---|---|---|---|
|  | Example 2 | Example 3 | Example 4 | Example 5 |
| Non-Productive (NP) |  |  |  |  |
| Butyl BK-1675 | 100 | 70 | 30 |  |
| Ionic Butyl 14565P |  | 30 | 70 | 100 |
| Wingtack 86 tackifier resin | 30 | 30 | 30 | 30 |
| Hubercarb ® Q3 calcium carbonate | 100 | 100 | 100 | 100 |

TABLE 4-continued

Additional Examples

| | Example 2 | Example 3 | Example 4 | Example 5 |
|---|---|---|---|---|
| Sidistar ® 320 silica | 50 | 50 | 50 | 50 |
| Akrosperse ® 802 Yellow | 2 | 2 | 2 | 2 |
| Struktol WB42* processing additive | 4 | 4 | 4 | 4 |
| Total (NP) | 286 | 286 | 286 | 286 |
| Productive 2$^{nd}$ Pass | | | | |
| NP | 286 | 286 | 286 | 286 |
| Vul-Cup 40KE | 3 | 3 | 3 | 3 |
| Di-Cup 40KE | 9 | 9 | 9 | 9 |
| TOTAL | 298 | 298 | 298 | 298 |
| ODR 302° F./3°Arc/50 Rotor/30 minutes | | | | |
| Torque at 0 min (lbf · in) | 20 | 20 | 20 | 20 |
| Torque at 30 min (lbf · in) | 1.33 | 1.55 | 2.49 | 3.36 |
| Green Strength | | | | |
| Tensile (psi) | 33 | 171 | 187 | 338 |
| Elongation (%) | >900 | 927 | 534 | 707 |
| M100 (psi) | 316 | 541 | 542 | 699 |
| M200 (psi) | 269 | 661 | 693 | 938 |
| M100 (psi) | 211 | 818 | 905 | 1304 |

All of the compositions had initial torque of approximately 20 lbf·in, which reduce to less than 4 lbf·in due chain cessation in ODR equipment (30 minutes at 302° F.) thus forming sealant materials. Ionic butyl containing materials (Examples 3, 4 and 5) have significantly higher green strength compared to 100% butyl rubber based composition (Example 2). Thus, ionic butyl rubber-based sealant precursor is easier to handle.

Tire Building

Composition of ionic butyl-based sealant precursor scaled-up and its properties are shown in Table 5.

TABLE 5

Ionic-butyl based sealant precursor scaled-up and its properties

| | Scaled-up Precursor |
|---|---|
| Non-Productive (NP) | |
| Ionic Butyl (Butyl 14565P) | 100 |
| Koresin | 5 |
| Paraffinic Oil | 25 |
| Hubercarb ® Q3 | 100 |
| Sidistar ® 320 | 50 |
| Akrosperse ® 626 Blue | 2 |
| Struktol HPS11 | 4 |
| Total (NP) Productive Mixing (2$^{nd}$ Pass) | 286 |
| NP | 286 |
| Vul-Cup 40KE | 3 |
| Di-Cup 40KE | 9 |
| TOTAL | 298 |
| ODR 150° C./R25/30'/3° Arc | |
| Initial Torque (lbf · in) | 15 |
| Minimum Torque, ML (lbf · in) | 4.49 |
| Torque at 30' (lbf · in) | 4.49 |

TABLE 5-continued

Ionic-butyl based sealant precursor scaled-up and its properties

| | Scaled-up Precursor |
|---|---|
| Green Strength | |
| Tensile (psi) | 124 |
| % Elongation | 1255 |
| M100 (psi) | 46 |
| M200 (psi) | 52 |
| M300 (psi) | 55 |

Composition of sealant cover layer is shown in Table 6.

TABLE 6

Composition of sealant cover layer

| Ingredient | Sealant Cover Layer Amount (phr) |
|---|---|
| Natural Rubber | 70.00 |
| SBR-1502 | 30.00 |
| Silane treated clay | 44 |
| Titanium Dioxide (Rutile) | 5 |
| Ultra-Sil 360 (55 BET) | 8 |
| Medium Process Oil | 1.00 |
| Stearic Acid | 1.0 |
| Zinc Stearate | 0.5 |
| Polymeric hindered phenol | 1.5 |
| Zinc Oxide | 3.5 |
| Red Rubber Concentrate | 1.00 |
| Yellow Concentrate | |
| Total NP1 | 166.5 |
| NP1 | 166.5 |
| Diphenyl Guanidine (75% DPG = 0.27 phr) | 0.20 |
| Benzothiazyl disulfide (MBTS) | 2.00 |
| Insoluble Sulfur (Crystex HD-OT 20 = 2.06 phr) | 0.6 |
| ZBED/ZBEC | 0.75 |
| TBzTD | 1.00 |
| TOTAL | 171.1 |

Sealant Performance Test

A 315/80R22.5 truck and bus tire was built where final thickness of sealant precursor was 3 mm and final thickness of sealant cover layer was 1.5 mm.

Sharpened 20D nail was used for puncture test. The nail has length of 4 inches (10.16 cm) and diameter of 0.192 inches (4.88 mm).

The tire was inflated to 100 psi. Then a 20D nail was inserted through tread lug and then removed. No air leak was observed.

Then another 20D nail was inserted through the groove on the tread and then removed. Again no air leak was observed.

For ease of illustration, some internal materials of the tire have been omitted from the drawings, such as belts and plies, but they remain in the finished tire.

Figure 2:
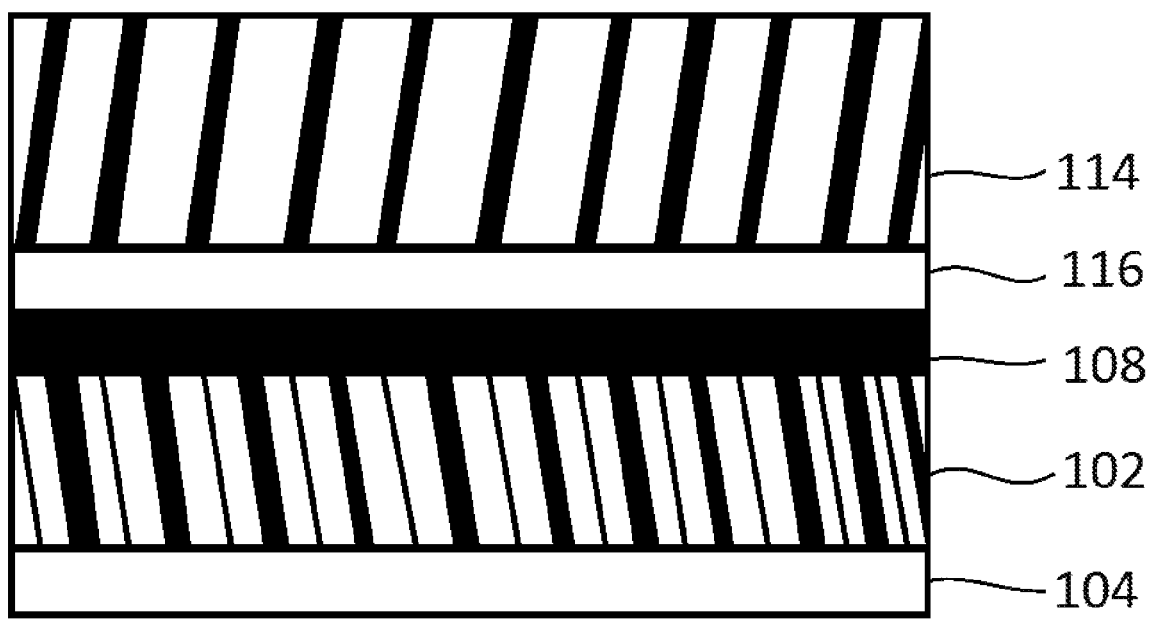
FIG. 2 is a cross-sectional enlarged view of the tire in FIG. 1 taken along line 2-2.

FIG. 1 and the expanded view through 2-2 shown in FIG. 2 illustrates the use of the present invention. It is a simplified illustration of the sealant and sealant cover layers in a cured tire 10, where the layers are not shown to scale since it is the ordering of the layers, not the specific widths and thicknesses that is important. The width can range from full tire width, down to a small strip along the center of the tire. A sealant layer 102 formed from precursor layer and a sealant cover layer or innerliner 104 are shown in a general form. Cover layer 104 is shown extending the width of the tire sidewalls 106, but it is employed as is known in the art. Once the tire is vulcanized, the sealant 102 will form from precursor layer. FIG. 1 also illustrates the present invention in which the sealant layer is between innerliner 104 and a layer of squeegee 108. Squeegee layer 108 is between the innermost layer of supporting carcass 116 and the sealant layer 102, formed from precursor layer during tire cure. The use of a squeegee layer is known in the art and is optional and employed as needed in the process of creating the sealant layer. FIG. 1 also shows tread 114, carcass ply 116, and the inextensible beads 118, and tire sidewalls 106 which are part of the tire.

Figure 3:
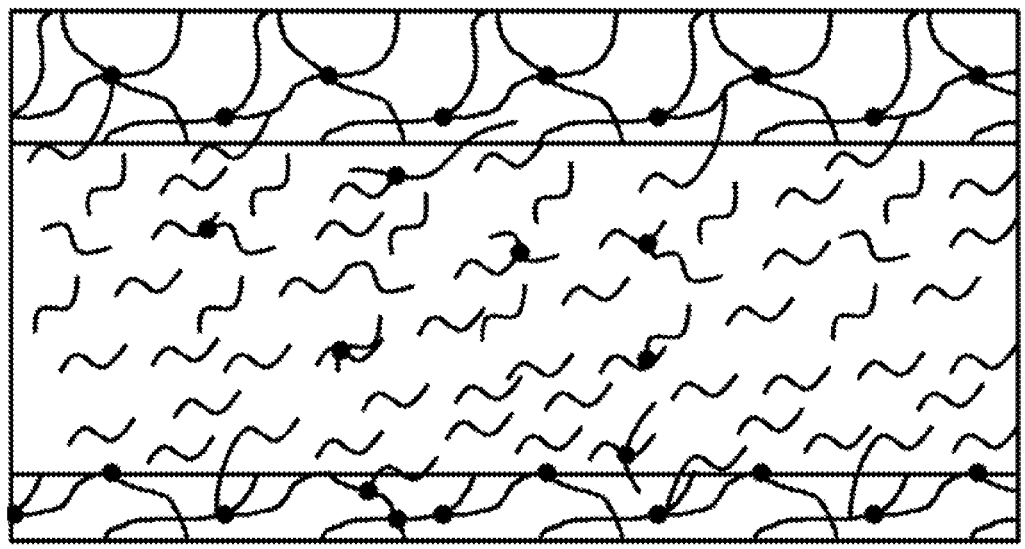
FIG. 3 is a depiction of a microscopic level of the present invention showing low molecular weight ionic butyl oligomer and the surrounding layers showing interfacial bond formation.

FIG. 3 and FIG. 4 are respectively depiction of a microscopic level of the present invention and the prior art (USPA 2016/0068031 A1) respectively. In the present invention, a layer inner to sealant is needed to prevent fouling of the tire bladder mold during vulcanization. The width of the sealant cover layer must be greater than the sealant layer so that the sealant is tightly encased between vulcanized rubber layers to prevent its movement during tire storage or tire use. The innermost layer is chemically bonded to the sealant layer to form strong bonding so that the sealant cover layer does not fall off during tire use. In contrast, the sealant tire of prior art has no sealant cover layer and the sealant may fall off or move during tire storage or use resulting in tire balance issues. Moreover, the exposed sealant tire needs special storage as it may trap small animals and birds which may rot inside tire. A film may be placed on the top of sealant tire of prior art, however, due to absence of chemical bonding between the sealant and the film, the film may fall off and the film may not protect the sealant from movement during storage or tire use (USPA 2009/0205765).

In the present invention, long chains of ionic butyl precursor are broken down to smaller chain length and easy to flow oligomer and the prior art has significantly bigger chain length and the polymer do not flow to plug nail holes. In prior art sealant, to reduce the viscosity of big chain length polymers, solvents are added in large amount to dissolve and are shown in the circles in FIG. 4. The polymer solution becomes of very low viscosity and hence the long butyl ionomer chains are cross linked to increase the viscosity and this is shown in solid circles in FIG. 4. Since butyl ionomer has a small percentage of isoprene, some cross linking reaction simultaneously take place besides chain cessation which is shown in solid circles in FIG. 3 of the present invention. The present invention, in contrast, contains essentially no solvents. No solvents are added during production, however, trace mounts may form during chain cessation. This shows the significant composition differences between the present invention and the prior art.

In the present invention, sealant precursor is heated with uncured outer layer forming strong chemical bond between the two (FIG. 3). Strong bonding is needed, otherwise, sealant may separate from outer layer generating scrap tires. In prior art, pre-formed sealant is inserted inside cured tire which forms very weak bond due to absence of interfacial bond (vide supra) and may even fall off prematurely during the use of tire (FIG. 4).

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated.

What is claimed is:

1. A tire with in-situ generated built-in puncture sealant comprising:
   a supporting tire carcass comprised of one or more layers of ply, an outer circumferential tread, and a radially inner layer,
   a pair of beads,
   sidewalls extending radially inward from the axial outer edges of the tread portion to join the respective beads,
   a sealant comprising the chain cessation product of a butyl ionomer-based rubber sealant precursor composition catalyzed by peroxide disposed inwardly from said radially inner layer, and
   wherein said sealant provides self-sealing properties to the tire.

2. The tire of claim 1, further including a cover layer over said sealant, wherein said cover layer is the innermost layer, and protects against contamination when the tire is subjected to a tire-curing process.

3. The tire of claim 2, wherein said cover layer has a 100% modulus of 0.5 MPa to 2.5 MPa.

4. The tire of claim 1 wherein said sealant layer is generated using a peroxide having a Self-Accelerating Decomposition Temperature (SADT) in the range 50-140° C.

5. The tire of claim 1 wherein low molecular weight ionic butyl ionomer is formed by chain cessation.

6. The tire of claim 1 wherein low molecular weight oligomeric ionic butyl ionomer is formed by chain cessation.

7. The tire of claim 1 wherein storage modulus (G') of sealant precursor at 80° C./5% strain/1 Hz is in the range 0.11-0.3 MPa.

8. The tire of claim 1 wherein storage modulus (G') of sealant at 80° C./5% strain/1 Hz is in the range 0.001-0.30 MPa.

9. The tire of claim 1 wherein said sealant is free of solvent.

10. The tire of claim 1 wherein said sidewalls extending radially inward from the axial outer edges of the tread portion to join the respective beads form a tire cavity, and wherein said sealant is not exposed to said tire cavity.

11. The tire of claim 1 wherein said sealant is chemically bonded both to its outer layer and to the innermost layer.

12. The tire of claim 1 wherein said butyl ionomer-based rubber sealant precursor composition comprises a blend of ionic butyl and butyl in the ranges of 95-5 phr ionic butyl and 5-95 phr butyl.

13. The tire of claim 1, wherein said butyl ionomer sealant precursor composition comprises, based on its polymer content, about 100 parts by weight butyl ionomer rubber having a number average molecular weight of 200,000 to 500,000, and a Mooney viscosity ranging from about 40 to 58, about 5 to 35 parts by weight of an oil extender, about 100 parts of calcium carbonate, about 50 parts of silica, and about 1 to 16 parts per hundred rubber (phr) of a peroxide chain cessation catalyst.

14. The tire of claim 13 where 100% modulus (M100) of sealant precursor is in the range 400-900 psi and preferably in the range 450-700 psi.

15. The tire of claim 13 wherein low molecular weight ionic butyl ionomer is formed by chain cessation.

16. The tire of claim 13 wherein low molecular weight oligomeric ionic butyl ionomer is formed by chain cessation.

* * * * *